United States Patent
Chen (10) Patent No.: US 8,164,709 B2
(45) Date of Patent: Apr. 24, 2012

(54) SIDE TYPE BACKLIGHT MODULE, LIQUID CRYSTAL DISPLAY, AND ASSEMBLY METHODS THEREOF

(75) Inventor: Yao-Chien Chen, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 544 days.

(21) Appl. No.: 12/352,095

(22) Filed: Jan. 12, 2009

(65) Prior Publication Data
US 2009/0180054 A1 Jul. 16, 2009

(30) Foreign Application Priority Data
Jan. 14, 2008 (TW) .............................. 97101349 A (51) Int. Cl.
*G02F 1/13357* (2006.01)
*F21V 8/00* (2006.01)
(52) U.S. Cl. .............................. 349/65; 349/58; 362/612
(58) Field of Classification Search .................... 349/58, 349/65, 68; 362/612, 631, 633
See application file for complete search history.

(56) References Cited

U.S. PATENT DOCUMENTS

| 6,825,894 | B2 | 11/2004 | Aoyagi et al. | |
| 7,056,001 | B2 | 6/2006 | Chuang | |
| 2002/0181188 | A1* | 12/2002 | You et al. | 361/681 |
| 2008/0043171 | A1* | 2/2008 | Takahashi et al. | 349/65 |

FOREIGN PATENT DOCUMENTS

| CN | 201100593 Y | 8/2008 |
| JP | 2005122057 A | 5/2005 |
| TW | 577549 U | 2/2004 |
| TW | 200410011 | 6/2004 |

* cited by examiner

*Primary Examiner* — Dung Nguyen
*Assistant Examiner* — Tai Duong
(74) *Attorney, Agent, or Firm* — Lowe Hauptman Ham & Berner LLP (57) ABSTRACT

A side type backlight module includes a light guide plate and a circuit board with at least one light emitting device thereon. The light guide plate has a first surface defining a light emitting surface, a second, opposite surface, and a light incident surface connecting the first and second surfaces. The circuit board is directly adhered to a part of the first or the second surface adjacent to the light incident surface. The light emitting device is thus disposed beside the light incident surface.

18 Claims, 14 Drawing Sheets

SIDE TYPE BACKLIGHT MODULE, LIQUID CRYSTAL DISPLAY, AND ASSEMBLY METHODS THEREOF

This application claims the benefit of Taiwan application Serial No. 097101349, filed Jan. 14, 2008, the entire disclosure of which is incorporated herein by reference.

BACKGROUND

The disclosure generally relates to a display apparatus, a light source module, and assembly methods thereof, and more particularly, to a liquid crystal display (LCD), a side type backlight module, and assembly methods thereof.

Along with the development of video technologies, liquid crystal displays (LCD) have been broadly applied to different electronic products, such as mobile phones, notebook computers, personal computers (PCs), personal digital assistants (PDAs) etc. However, because the LCD panel of an LCD does not self-emit light, a backlight module is disposed behind the LCD panel for providing a light source to the LCD panel, so as to allow the LCD panel to display images.

Figure 1:
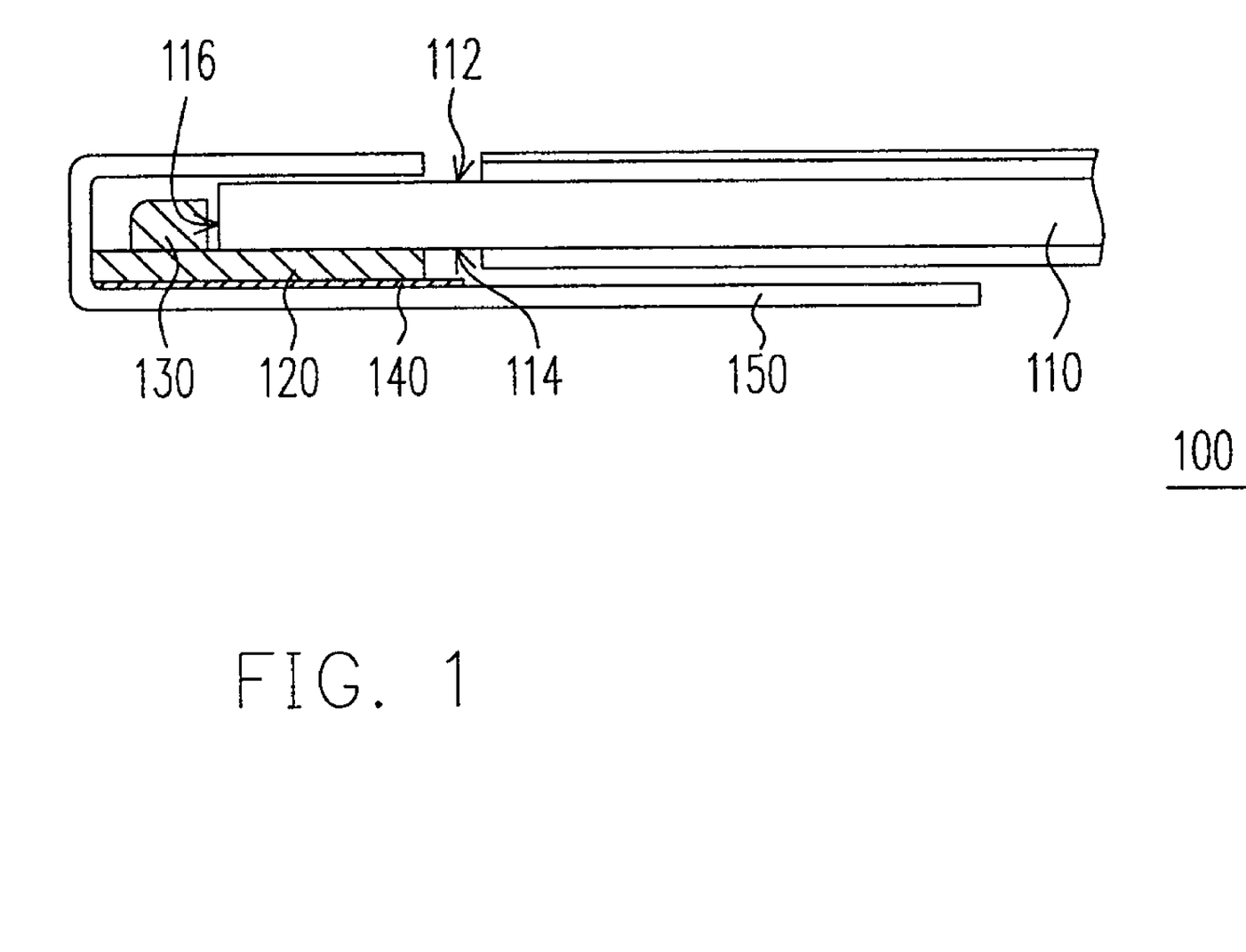
FIG. 1 is a partial cross-sectional view of a known side type backlight module.

FIG. 1 is a partial cross-sectional view of a side type backlight module 100 known to the inventor(s). In FIG. 1, the known side type backlight module 100 includes a light guide plate 110, a circuit board 120, a plurality of light emitting diodes (LEDs) 130, an adhesive layer 140, and a fixing frame 150. The light guide plate 110 has a first surface 112, a second surface 114, and a light incident surface 116 which connects the first surface 112 and the second surface 114. The LEDs 130 are disposed on the circuit board 120 and located beside the light incident surface 116. The fixing frame 150 encloses the circuit board 120, the LEDs 130, and the part of the light guide plate 110 adjacent to light incident surface 116. The adhesive layer 140 is disposed between the circuit board 120 and the fixing frame 150 for adhering the circuit board 120 to the bottom of the fixing frame 150. The circuit board 120 is thus disposed between the second surface 114 of the part of the light guide plate 110 adjacent to light incident surface 116 and the bottom of the fixing frame 150.

A method of assembling the known side type backlight module 100 includes following steps. First, the fixing frame 150 is provided. Then, the circuit board 120 with the LEDs 130 is adhered to the bottom of the fixing frame 150 through the adhesive layer 140. Next, the part of the light guide plate 110 adjacent to the light incident surface 116 is placed into the fixing frame 150 so that the light guide plate 110 is located on the circuit board 120 and the LEDs 130 are located beside the light incident surface 116.

In the assembly method of the known side type backlight module 100, because the circuit board 120 having the LEDs 130 is first adhered to the bottom of the fixing frame 150, when the light guide plate 110 is placed into the fixing frame 150, it is difficult and/or time consuming to position the light guide plate 110 so as to achieve a desired distance between the LEDs 130 and the light incident surface 116 or to position all the LEDs 130 close to the light incident surface 116. If the distance between each of the LEDs 130 and the light incident surface 116 is not consistent or a difference between such distance and an optimal value exceeds a tolerable range, the light source provided by the side type backlight module 100 may not be satisfactory or may even have to be reworked. Besides, the foregoing components have to be taken out of the fixing frame 150 to be adjusted when the side type backlight module 100 is reworked. Thereby, the known side type backlight module 100 is difficult and time-consuming to assemble or rework and suffers from a low assembly yield.

BRIEF DESCRIPTION OF THE DRAWINGS

One or more embodiments are illustrated by way of example, and not by limitation, in the figures of the accompanying drawings, wherein elements having the same reference numeral designations represent like elements throughout.

DESCRIPTION OF EMBODIMENTS

Figure 2A:
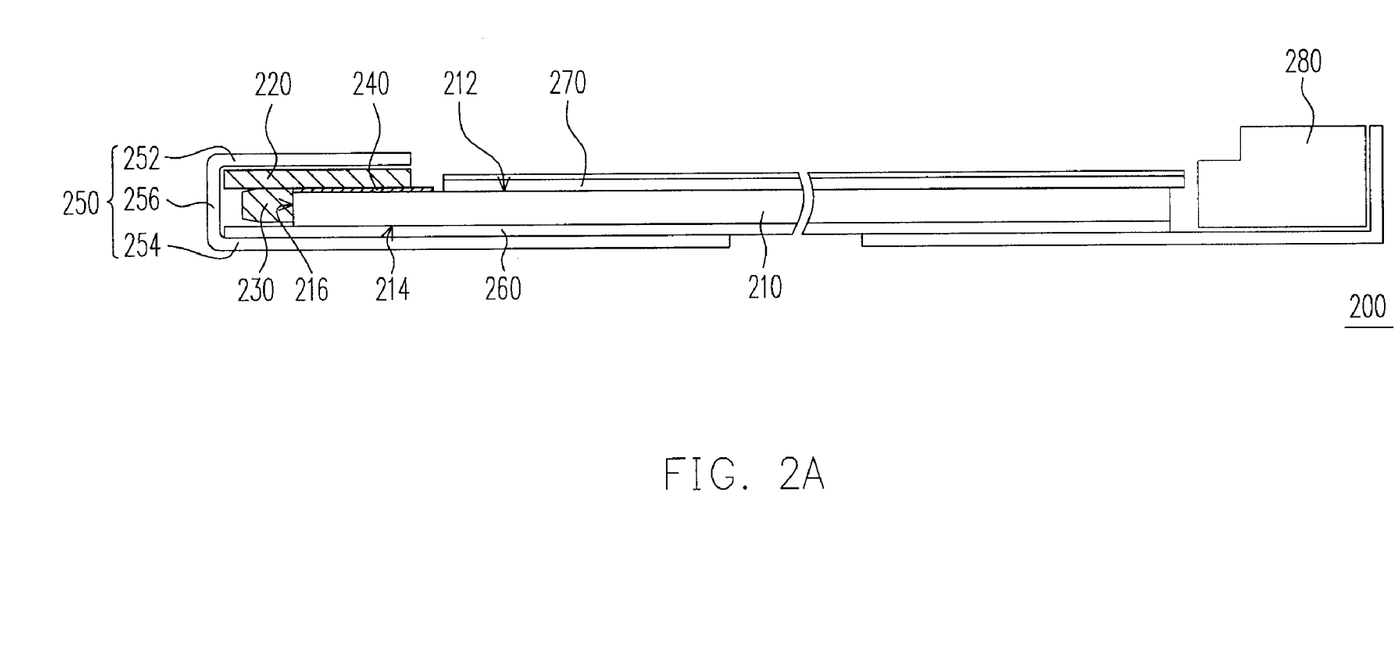
FIG. 2A is a cross-sectional view of a side type backlight module according to an embodiment.
Figure 2B:
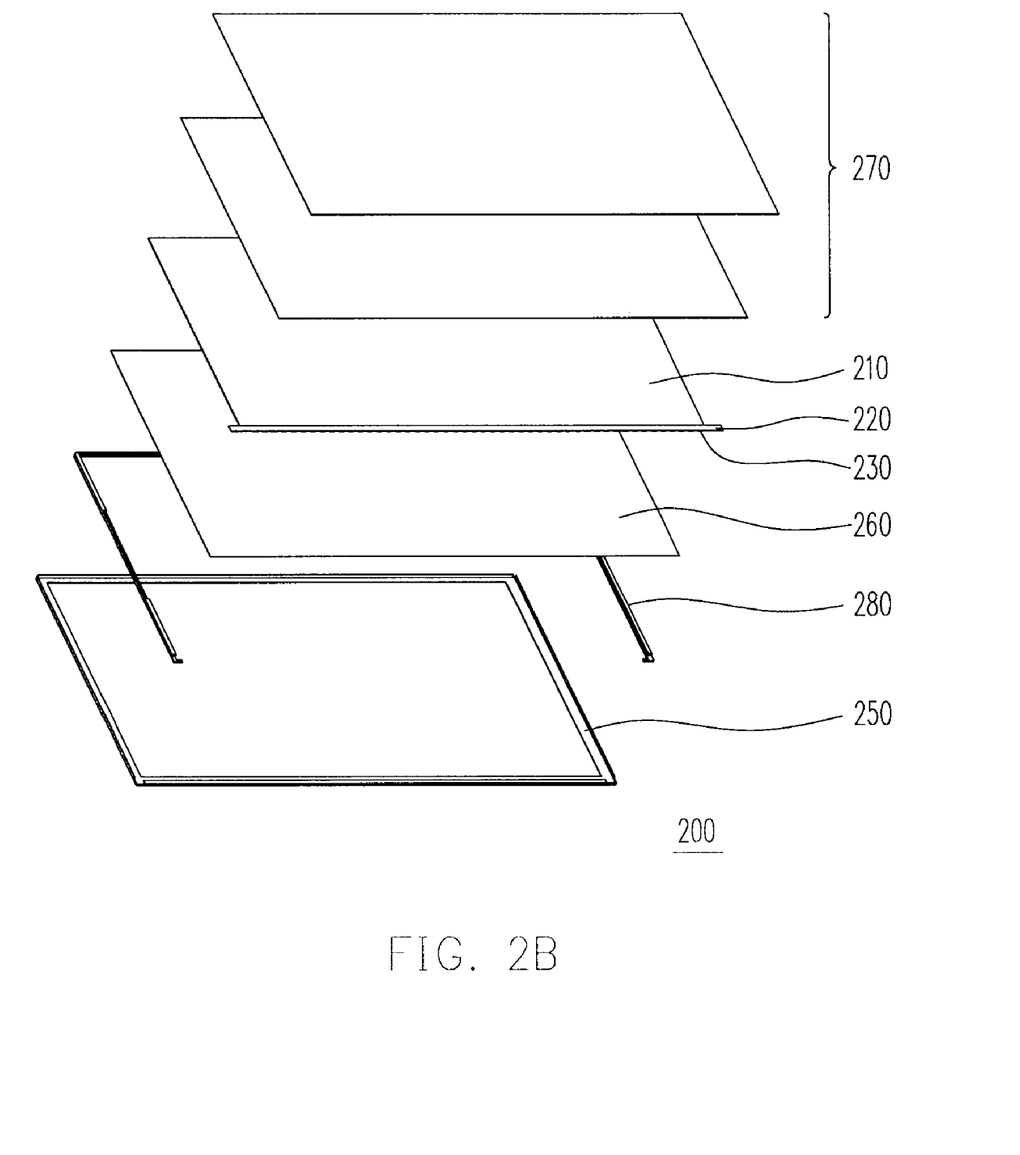
FIG. 2B is an exploded view of the side type backlight module in FIG. 2A.

FIG. 2A is a cross-sectional view of a side type backlight module 200 according to an embodiment, and FIG. 2B is an exploded view of the side type backlight module in FIG. 2A. In FIG. 2A and FIG. 2B, the side type backlight module 200 includes a light guide plate 210, a circuit board 220, at least one light emitting device 230, and an adhesive layer 240. The light guide plate 210 has a first surface 212, a second surface 214, and a light incident surface 216 which connects the first surface 212 and the second surface 214, wherein the first surface 212 is a light emitting surface. The circuit board 220 is disposed on a part of the first surface 212 adjacent to the light incident surface 216. The light emitting device 230 is disposed on the circuit board 220 and located beside the light incident surface 216. The adhesive layer 240 is disposed between the circuit board 220 and the light guide plate 210 so that the circuit board 220 is adhered to the part of the first surface 212 adjacent to the light incident surface 216. The adhesive layer 240 in some embodiments is a double-sided adhesive tape. Other arrangements for attaching the circuit board 220 and the light guide plate 210 are, however, not excluded.

In the side type backlight module 200, the circuit board 220 is adhered to the light guide plate 210 through the adhesive layer 240. Thus, there will be no relative displacement between the circuit board 220 and the light guide plate 210 and accordingly the distance between the light emitting device 230 and the light incident surface 216 on the circuit board 220 can be precisely controlled and fixed to a desired value. Thereby, it is ensured that a light emitted by the light emitting device 230 enters the light guide plate 210 with the optimal condition and a high-quality planar light source is provided by the side type backlight module 200.

The light emitting device 230 in some embodiments comprises at least one light emitting diode (LED). In addition, the side type backlight module 200 in some embodiments includes a fixing frame 250 disposed beside the light incident surface 216. The fixing frame 250 in some embodiments comprises an upper board 252, a lower board 254, and a side board 256 connected between the upper board 252 and the lower board 254, wherein the light emitting device 230 is located between the light incident surface 216 and the side board 256, the circuit board 220 is located between the first surface 212 and the upper board 252, and the lower board 254 is located below the second surface 214.

In the known side type backlight module 100 in FIG. 1, the circuit board 120 is located between the light guide plate 110 and the bottom of the fixing frame 150, while in the side type backlight module 200 in FIG. 2A, the circuit board 220 is disposed on the light guide plate 210. Thus, the distance between the first surface 212 of the light guide plate 210 and the bottom of the fixing frame 250 (i.e., the lower board 254) in the embodiment(s) of FIG. 2A is shorter than the distance between the first surface 112 of the light guide plate 110 and the bottom of the fixing frame 150 in the known structure of FIG. 1, by eliminating the thickness of the circuit board 120. Accordingly, when a display panel (for example, a liquid crystal display (LCD) panel) is disposed on the first surface 212, the thickness of the entire structure is reduced.

The light emitting device 230 in some embodiments is positioned close to the light incident surface 216 to prevent light leakage, i.e., a portion of light emitted by the light emitting device 230 that does not enter the light guide plate 210, so that a display light source of higher intensity can be provided by the side type backlight module 200. In addition, the side type backlight module 200 in some embodiments further includes a reflector sheet 260 disposed on the second surface 214 of the light guide plate 210. The external portion of the reflector sheet 260 in some embodiments is located between the second surface 214 and the lower board 254. Moreover, the side type backlight module 200 in some embodiments further includes an optical film 270 disposed above the first surface 212. The optical film 270 in some embodiments comprises at least one of a lens sheet, a diffuser sheet, a protector film, and other suitable optical films.

Figure 3:
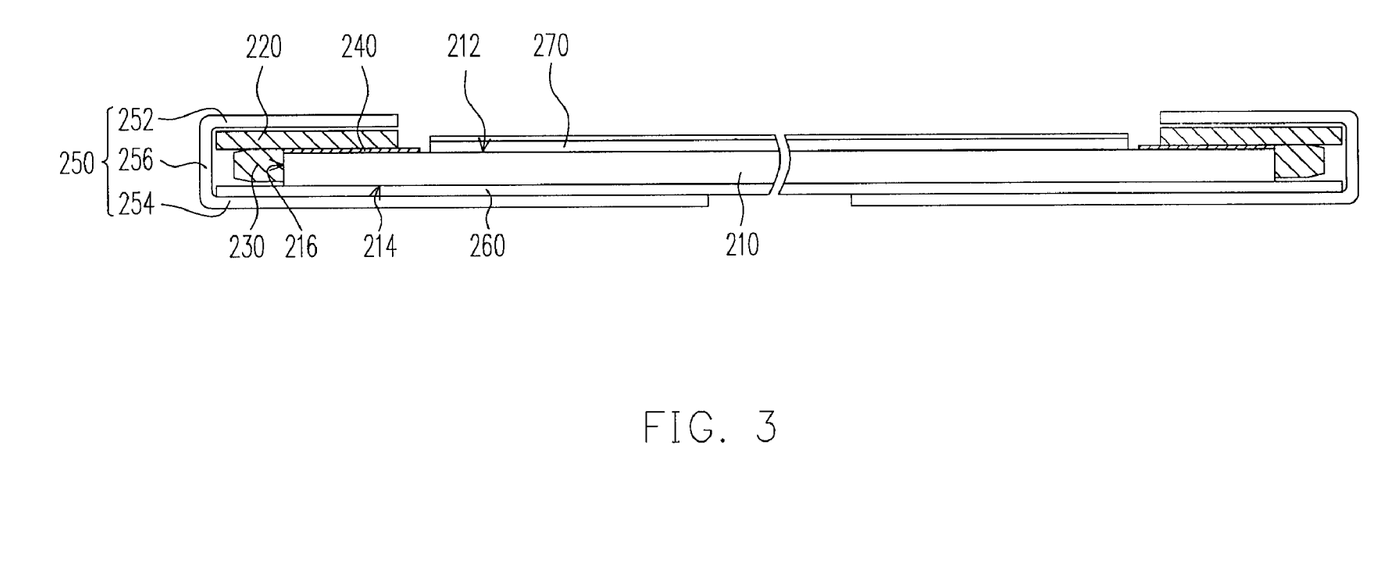
FIG. 3 is a cross-sectional view of a side type backlight module, wherein a light emitting device is respectively disposed at opposite sides of a light guide plate.

The side type backlight module 200 in some embodiments further includes a mold frame 280 disposed around the light guide plate 210 for supporting a display panel (for example, an LCD panel) disposed on the first surface 212. The light emitting device 230 is located at one side of the light guide plate 210, while the mold frame 280 is located at the other three sides of the light guide plate 210. The light emitting device 230 in some embodiments is respectively disposed at two opposite sides of the light guide plate 210 (as shown in FIG. 3), and the mold frame 280 is respectively disposed at the other two sides of the light guide plate 210. The light emitting device 230 in further embodiments is respectively disposed at three sides of the light guide plate 210, while the mold frame 280 is disposed at the remaining side. The light emitting device 230 in yet further embodiments is respectively disposed at each of all sides of the light guide plate 210.

Figure 4:
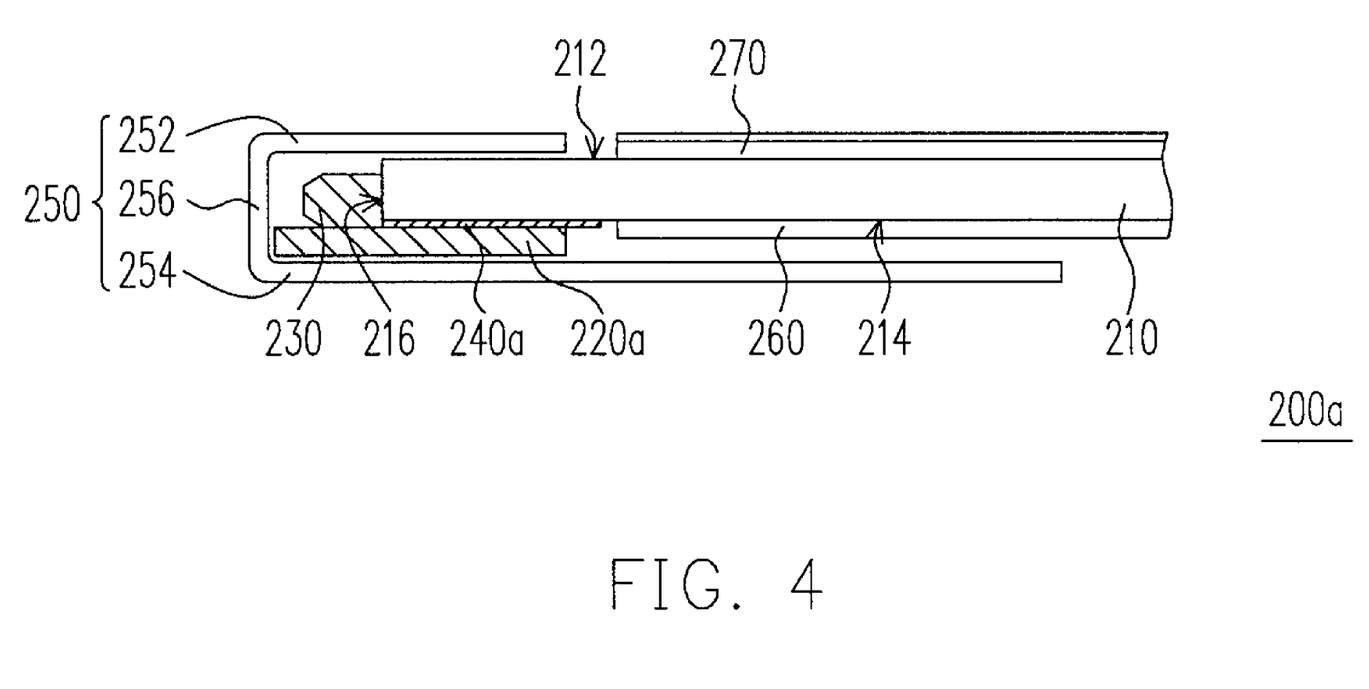
FIG. 4 is a partial cross-sectional view of a side type backlight module according to another embodiment.

FIG. 4 is a partial cross-sectional view of a side type backlight module 200a according to another embodiment. In FIG. 4, the side type backlight module 200a is similar to the side type backlight module 200 of FIG. 2A, and the difference between the two, in some aspects, is that in the side type backlight module 200a, the circuit board 220a is disposed on the part of the second surface 214 of the light guide plate 210 adjacent to the light incident surface 216, and the adhesive layer 240a is disposed between the second surface 214 and the circuit board 220a. In the embodiment of FIG. 4, it is still ensured that the light emitted by the light emitting device 230 enters the light guide plate 210 with the optimal condition and accordingly a high-quality planar light source is provided by the side type backlight module 200a.

Figure 5:
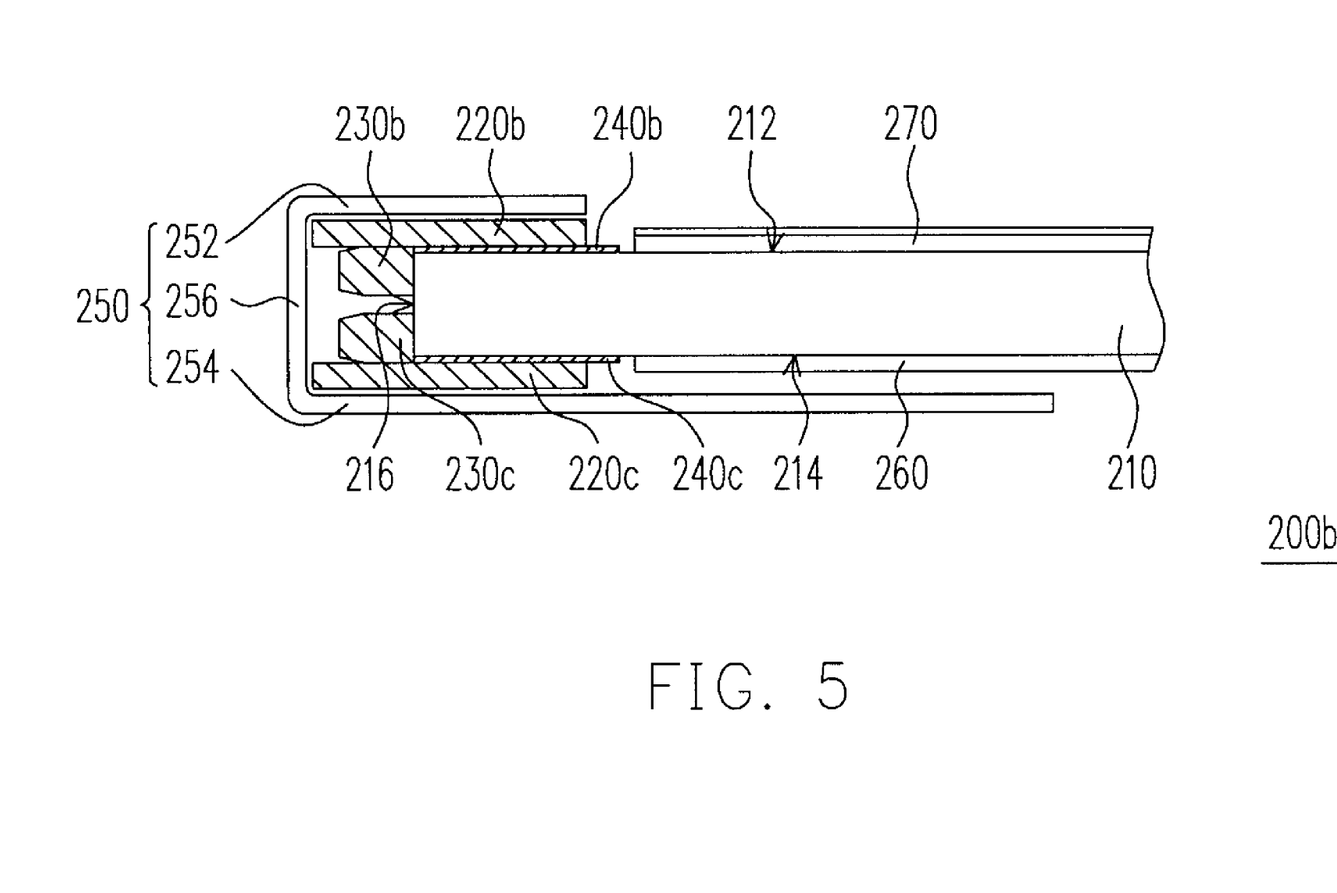
FIG. 5 is a partial cross-sectional view of a side type backlight module according to yet another embodiment.

FIG. 5 is a partial cross-sectional view of a side type backlight module 200b according to yet another embodiment. In FIG. 5, the side type backlight module 200b is similar to the side type backlight module 200 of FIG. 2A, and the difference between the two, in some aspects, is that in the side type backlight module 200b, circuit boards 220b and 220c are respectively disposed on the first surface 212 and the second surface 214 of the light guide plate 210, wherein the circuit board 220b is located on the part of the first surface 212 adjacent to the light incident surface 216, and the circuit board 220c is located on the part of the second surface 214 adjacent to the light incident surface 216. In addition, the light emitting device 230b disposed on the circuit board 220b and the light emitting device 230c disposed on the circuit board 220c are both located beside the light incident surface 216. Thus, in the side type backlight module 200b, the quantity of light emitting devices disposed beside the light incident surface 216 is two times of that in the side type backlight module 200 of FIG. 2A. Accordingly, the intensity of the display light source provided by the side type backlight module 200b is increased. Moreover, an adhesive layer 240b is located between the circuit board 220b and the first surface 212, and an adhesive layer 240c is located between the circuit board 220c and the second surface 214. Both the light emitting device 230b and the light emitting device 230c are therefore fixed at positions close to the light incident surface 216.

The circuit board 220b is located between the upper board 252 of the fixing frame 250 and the first surface 212, both the light emitting devices 230b and 230c are located between the side board 256 of the fixing frame 250 and the light incident surface 216, and the circuit board 220c is located between the lower board 254 of the fixing frame 250 and the second surface 214. In the embodiment of FIG. 5, it is also ensured that the light emitted by the light emitting device 230 enters the light guide plate 210 with the optimal condition and accordingly a high-quality planar light source is provided by the side type backlight module 200b.

Figure 6:
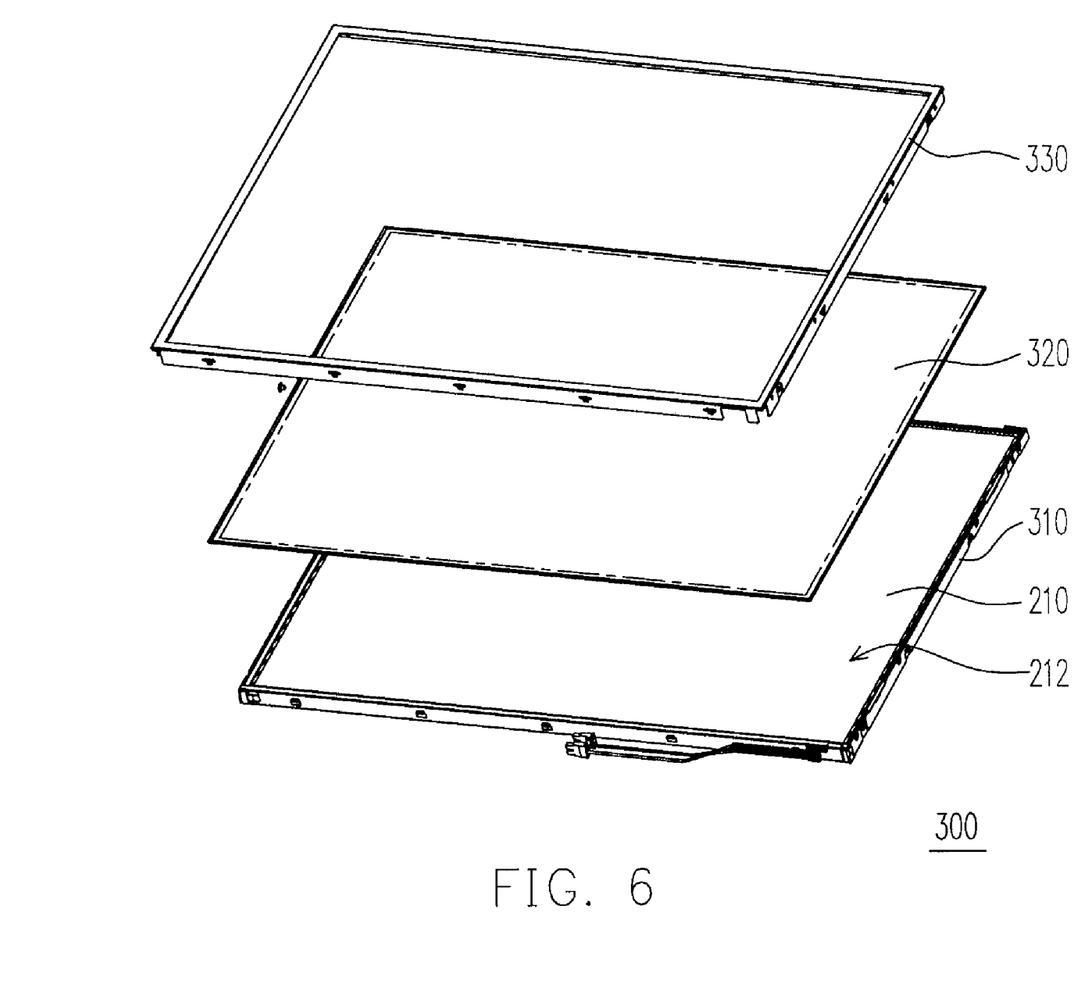
FIG. 6 is an exploded view of a liquid crystal display (LCD) according to an embodiment.

FIG. 6 is an exploded view of an LCD 300 according to an embodiment. The LCD 300 includes a side type backlight module 310 and an LCD panel 320, wherein the side type backlight module 310 may be the side type backlight module 200 of FIG. 2A, the side type backlight module 200a of FIG. 4, the side type backlight module 200b of FIG. 5, or variation thereof. The LCD panel 320 is disposed on the side type backlight module 310, and the first surface 212 of the light guide plate 210 faces the LCD panel 320. The LCD 300 in some embodiments further includes a front frame 330 disposed on the edges of the side type backlight module 310 and the edges of the LCD panel 320 for maintaining a fixed relative position between the side type backlight module 310 and the LCD panel 320.

Figure 7:
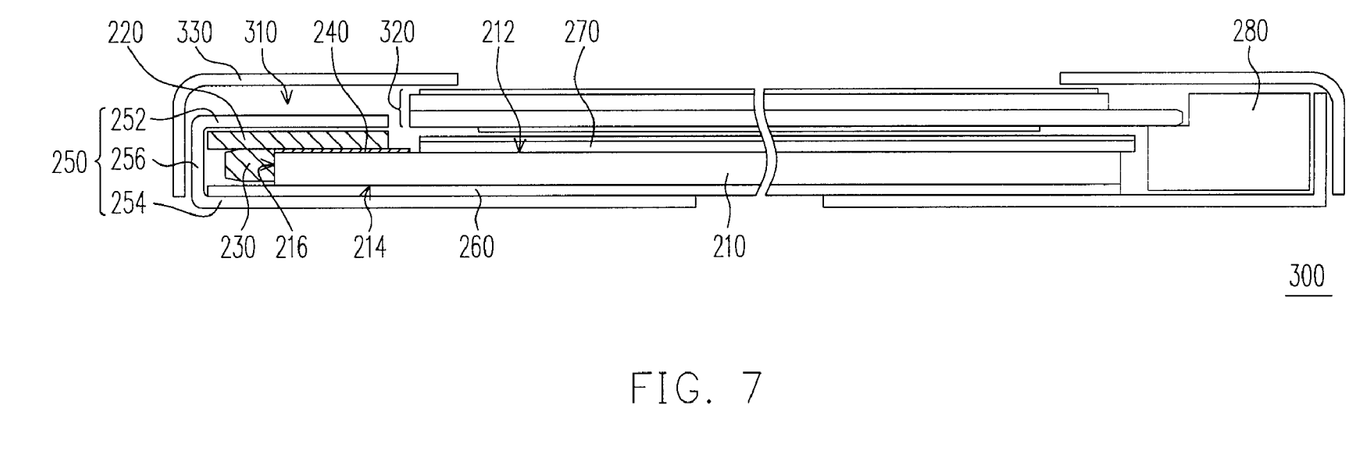
FIG. 7 is a cross-sectional view of the LCD in FIG. 6.

FIG. 7 is a cross-sectional view of the LCD in FIG. 6. In FIG. 7, the side type backlight module 200 illustrated in FIG. 2A is taken as an example of the side type backlight module 310 in the LCD 300. Because the distance between the first surface 212 of the light guide plate 210 and the lower board 254 of the fixing frame 250 is reduced, the thickness from the front frame 330 to the lower board 254 of the fixing frame 250 in the LCD 300 is also reduced to comply with the current trend of thin LCD design. In addition, the mold frame 280, if provided, supports the edges of the LCD panel 320.

Figure 8A:
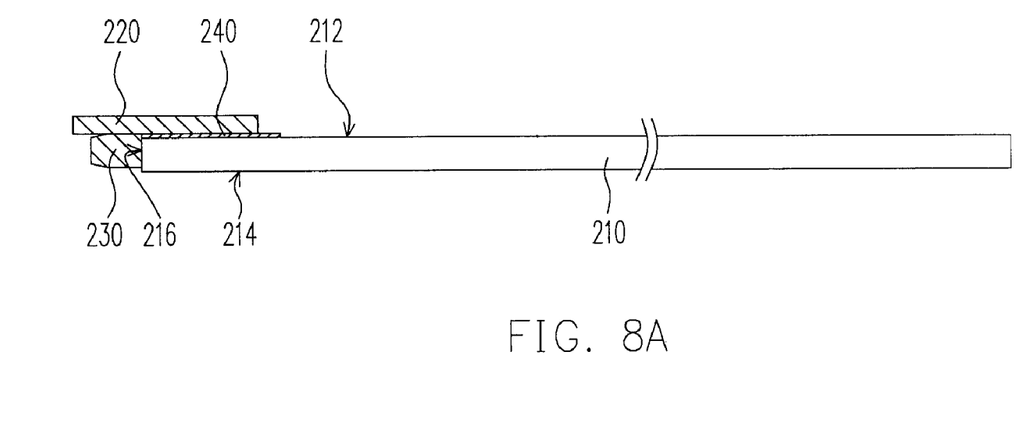
FIGS. 8A~8D are cross-sectional views illustrating a method of assembling a side type backlight module according to an embodiment.

FIGS. 8A~8D are cross-sectional views illustrating a method of assembling a side type backlight module according to an embodiment where the side type backlight module 200 of FIG. 2A is assembled as an example. First, as shown in FIG. 8A, the light guide plate 210 is provided. Then, the circuit board 220 is adhered to the part of the first surface 212 of the light guide plate 210 adjacent to the light incident surface 216 through the adhesive layer 240, wherein a light emitting device 230 is disposed on the circuit board 220, and the light emitting device 230 is located beside the light incident surface 216. Herein, the light emitting device 230 is selectively positioned close to the light incident surface 216. However, an appropriate distance may be kept between the light emitting device 230 and the light incident surface 216 according to actual design considerations.

Figure 8B:
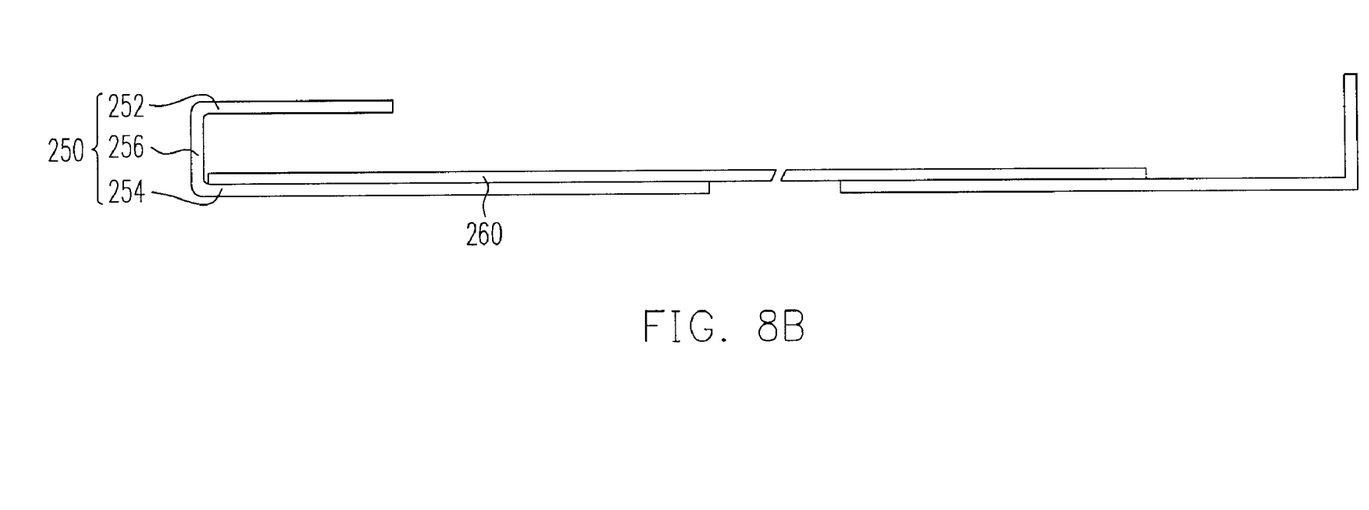
Figure 8C:
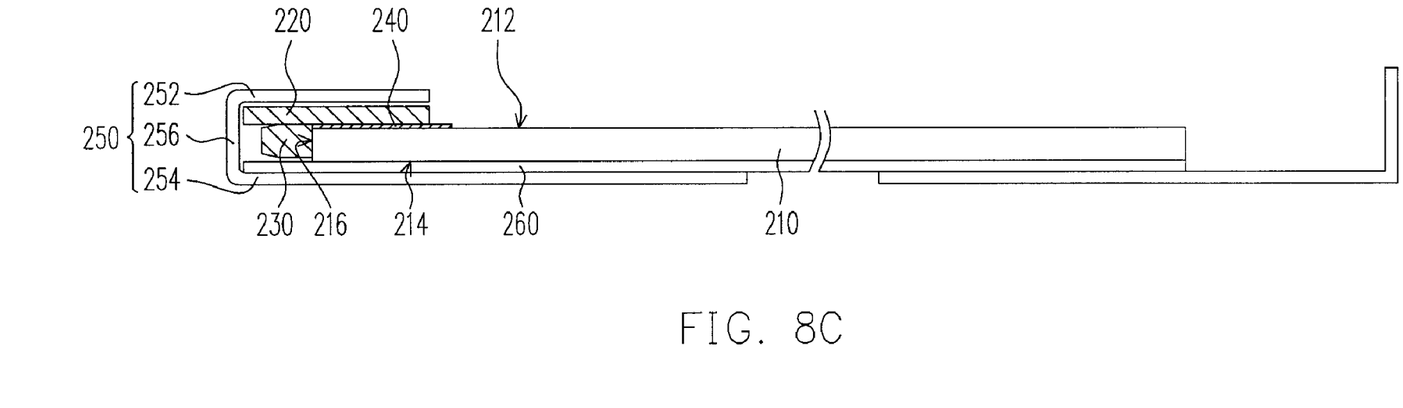

As shown in FIG. 8B, a fixing frame 250 is provided. After that, a reflector sheet 260 is selectively disposed on the bottom (i.e. the lower board 254) of the fixing frame 250, wherein the reflector sheet 260 in some embodiments is fixed by using a double-sided adhesive tape (not shown). Next, as shown in FIG. 8C, the light guide plate 210, as well as the circuit board 220 and the light emitting device 230 fixed thereto by the adhesive layer 240, are placed into the fixing frame 250 so that the light emitting device 230 is located between the light incident surface 216 and the side board 256 of the fixing frame 250, and the circuit board 220 is located between the light guide plate 210 and the upper board 252 of the fixing frame 250.

Figure 8D:
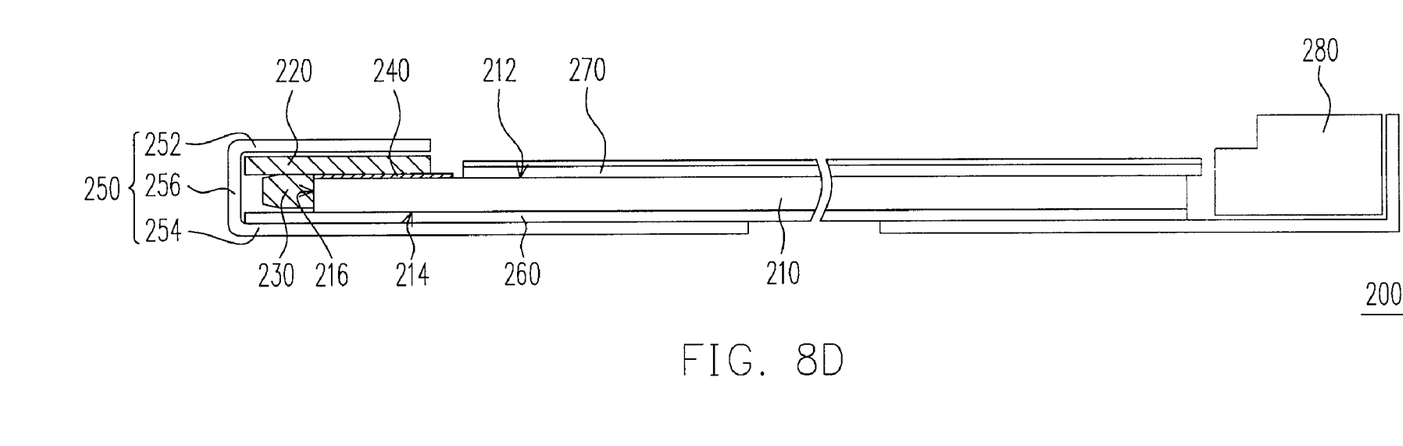

Thereafter, as shown in FIG. 8D, an optical film 270 is optionally disposed on the light guide plate 210. In addition, after the steps illustrated in FIG. 8C, a mold frame 280 is disposed in some embodiments around the light guide plate 210.

In the disclosed method, because the circuit board 220 having the light emitting devices 230 is first adhered to the light guide plate 210 through the adhesive layer 240, the distance between each light emitting device 230 and the light incident surface 216 can be precisely controlled and accordingly a desired display light source provided by the side type backlight module 200 can be achieved. Additionally, because the circuit board 220 is adhered to the light guide plate 210 instead of on the inner surface of the fixing frame 250, the adhering action is easy to perform. Thus, the disclosed method is convenient, offers a high assembly yield, requires little assembly time, and greatly reduces the possibility of reworking. Moreover, in the disclosed method, it can be ensured that each light emitting device 230 is positioned close to the light incident surface 216 so that light leakage can be avoided and accordingly the intensity of the display light source provided by the side type backlight module 200 can be increased.

Figure 9A:
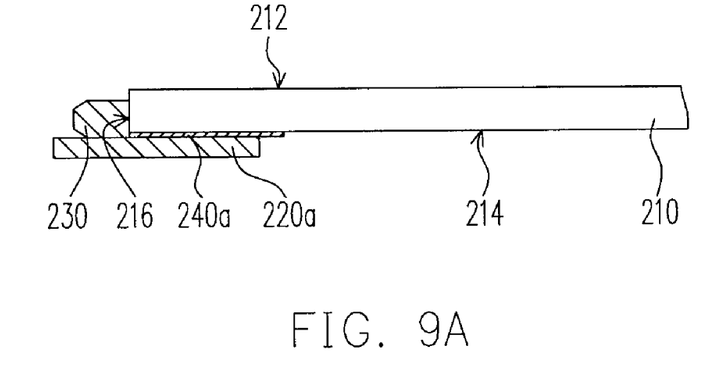
FIG. 9A and FIG. 9B are cross-sectional views that illustrate several steps in a method of assembling a side type backlight module according to another embodiment.
Figure 9B:
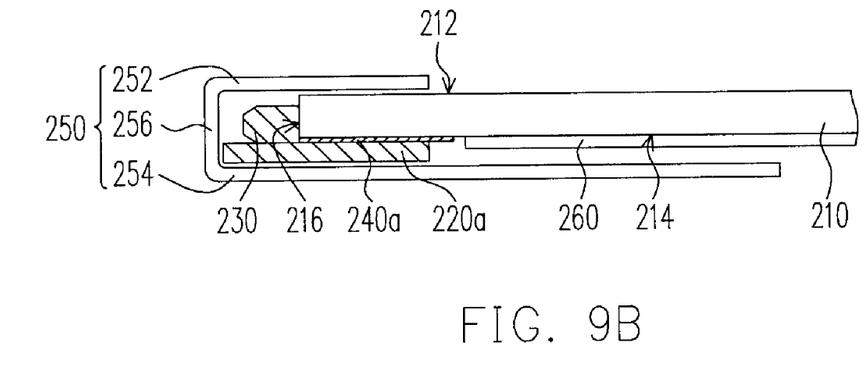

FIG. 9A and FIG. 9B illustrate several steps in a method of assembling a side type backlight module according to another embodiment in which the side type backlight module 200a of FIG. 4 is assembled as an example, and which is similar to the method illustrated in FIGS. 8A~8D except for the following steps. First, as shown in FIG. 9A, the circuit board 220a is adhered on the part of the second surface 214 of the light guide plate 210 adjacent to the light incident surface 216 through the adhesive layer 240a, wherein a light emitting device 230 is disposed on the circuit board 220a, and the light emitting device 230 is located beside the light incident surface 216. Herein, the light emitting device 230 is optionally positioned close to the light incident surface 216. After that, as shown in FIG. 9B, the light guide plate 210, as well as the circuit board 220a and the light emitting device 230 fixed thereto by the adhesive layer 240a, are placed into the fixing frame 250 so that the light emitting device 230 is located between the light incident surface 216 and the side board 256 of the fixing frame 250, and the circuit board 220a is located between the light guide plate 210 and the lower board 254 of the fixing frame 250.

Figure 10A:
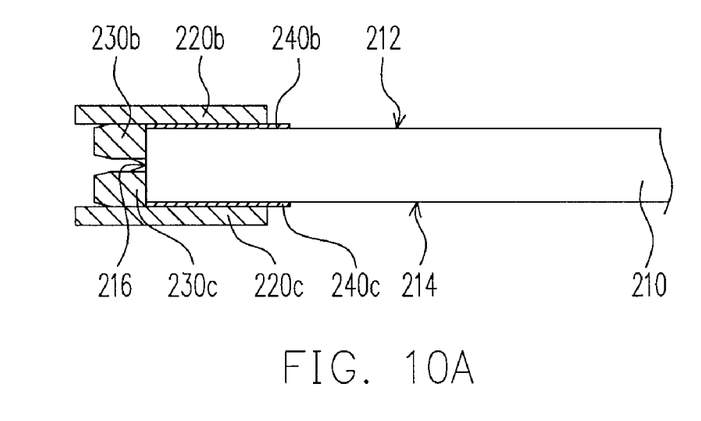
FIG. 10A and FIG. 10B are cross-sectional views that illustrate several steps in a method of assembling a side type backlight module according to yet another embodiment.
Figure 10B:
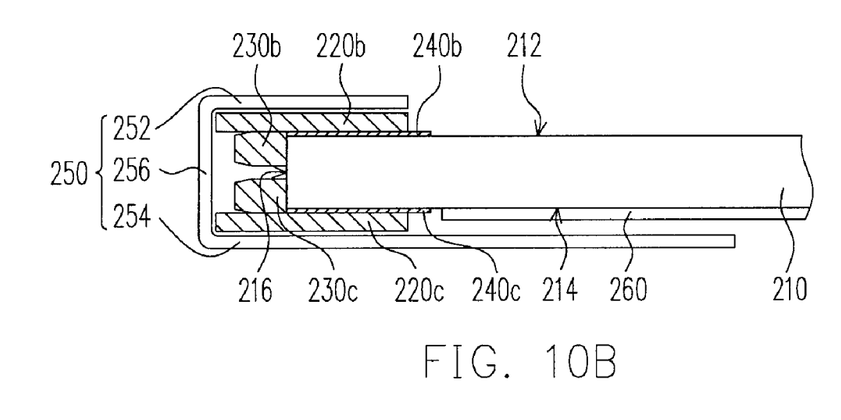

FIG. 10A and FIG. 10B illustrate several steps in a method of assembling a side type backlight module according to yet another embodiment in which the side type backlight module 200b of FIG. 5 is used as an example, and which is similar to the method illustrated in FIGS. 8A~8D except for the following steps. First, as shown in FIG. 10A, the circuit board 220b and the circuit board 220c are respectively adhered to the parts of the first surface 212 and the second surface 214 adjacent to the light incident surface 216 through the adhesive layer 240b and the adhesive layer 240c, wherein a light emitting device 230b and a light emitting device 230c are respectively disposed on the circuit board 220b and the circuit board 220c, and the light emitting devices 230b and 230c are located beside the light incident surface 216. Herein, the light emitting device 230b and the light emitting device 230c are optionally positioned close to the light incident surface 216. After that, as shown in FIG. 10B, the light guide plate 210, as well as the circuit boards 220b and 220c and the light emitting devices 230b and 230c fixed thereto by the adhesive layers 240b and 240c, respectively, are placed into the fixing frame 250 so that the light emitting devices 230b and 230c are located between the light incident surface 216 and the side board 256 of the fixing frame 250, the circuit board 220b is located between the first surface 212 of the light guide plate 210 and the upper board 252 of the fixing frame 250, and the circuit board 220c is located between the second surface 214 of the light guide plate 210 and the lower board 254 of the fixing frame 250.

It should be noted that one or more of the disclosed methods is/are used for assembling not only the side type backlight module 200 of FIG. 2A, the side type backlight module 200a of FIG. 4, and the side type backlight module 200b of FIG. 5, but also variations of the disclosed side type backlight modules without departing from the spirit and scope of the disclosure.

Figure 11A:
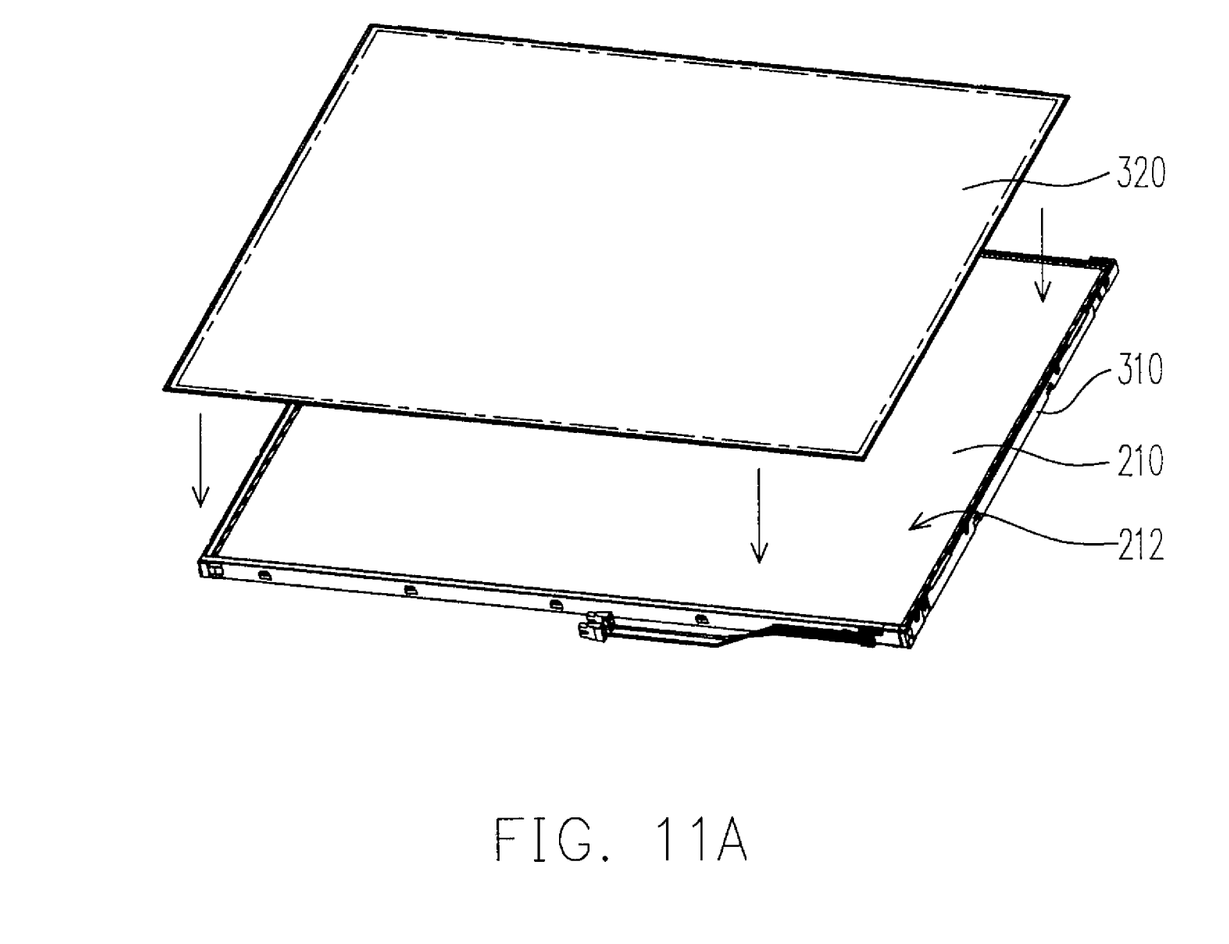
FIG. 11A and FIG. 11B are perspective views that illustrate several steps in a method of assembling an LCD according to an embodiment.
Figure 11B:
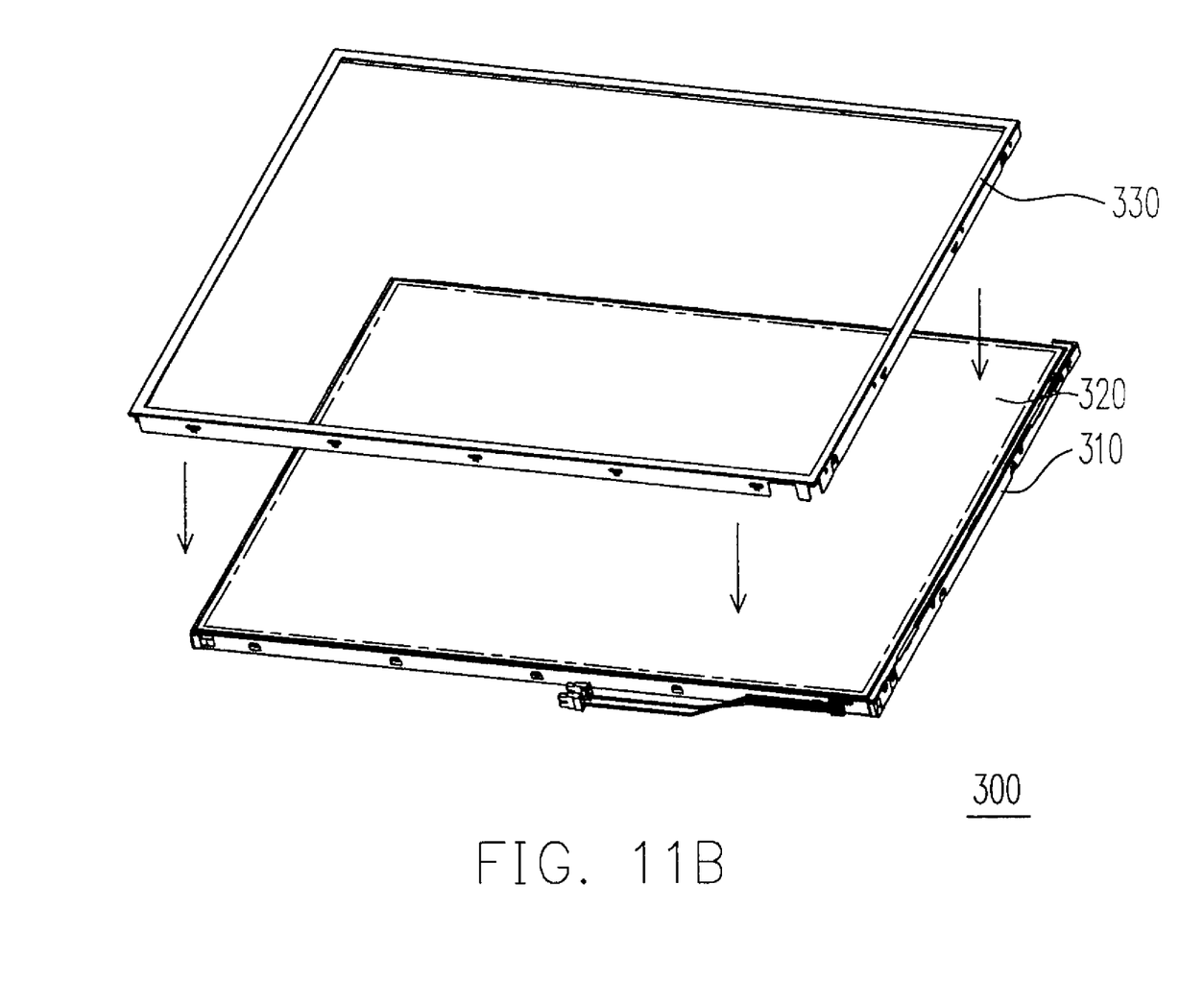

FIG. 11A and FIG. 11B illustrate several steps in a method of assembling an LCD according to an embodiment. As shown in FIG. 11A, first, after a side type backlight module (e.g., the side type backlight module 310) in any one of foregoing embodiments is assembled, an LCD panel 320 is disposed on the side type backlight module 310. To be specific, the LCD panel 320 is disposed on the light guide plate 210, wherein the first surface 212 of the light guide plate 210 faces the LCD panel 320. Then, as shown in FIG. 11B, a front frame 330 is disposed on the edges of the side type backlight module 310 and the edges of the LCD panel 320.

Since a desired state of the display light source provided by the side type backlight module 310 can be achieved in any method described above, the optical characteristic of the LCD 300 is improved.

As described above, in the disclosed side type backlight modules, LCDs, and methods of assembling the same, a circuit board having light emitting devices is first adhered to a light guide plate through an adhesive layer. Thus, the distance between each light emitting device and the light incident surface can be precisely controlled, and accordingly a desired state of the display light source provided by the side type backlight module can be achieved. As a result, the optical characteristic of the LCD is improved. The disclosed methods are convenient, offer high assembly yields, require little assembly time, and greatly reduce the possibility of reworking. In addition, the disclosed methods allow each light emitting device to be positioned close to the light incident surface so that light leakage caused when a portion of light emitted by the light emitting device does not enter the light guide plate can be avoided and accordingly the intensity of the display light source provided by the side type backlight module can be increased. Accordingly, the standard of the LCD is improved. Moreover, the thickness of the side type backlight module is reduced so that the thickness of the LCD is also reduced to meet the current trend of thin LCD design.

It will be apparent to those skilled in the art that various modifications and variations can be made to the specifically disclosed embodiments without departing from the scope and/or spirit of the disclosure.

What is claimed is:

1. A side type backlight module, comprising:
    a light guide plate, comprising
        a first surface defining a light emitting surface,
        a second surface opposite to the first surface, and
        a light incident surface which connects the first surface and the second surface;
    a first circuit board adhered to a part of the first surface adjacent to the light incident surface;
    a second circuit board adhered to a part of the second surface adjacent to the light incident surface;
    at least one first light emitting device, disposed on the first circuit board and located beside the light incident surface, and
    at least one second light emitting device, disposed on the second circuit board and located beside the light incident surface.

2. The side type backlight module according to claim 1, further comprising
    a first adhesive layer disposed between the first circuit board and the light guide plate and adhering the first circuit board to the light guide plate.

3. The side type backlight module according to claim 1, wherein the first light emitting device is positioned close to the light incident surface.

4. The side type backlight module according to claim 1, wherein the first light emitting device comprises at least a light emitting diode (LED).

5. The side type backlight module according to claim 1, further comprising
    a fixing frame disposed beside the light incident surface;
    wherein the first light emitting device is located between the light incident surface and the fixing frame, and the first circuit board is located between the light guide plate and the fixing frame.

6. The side type backlight module according to claim 5, wherein a part of the fixing frame is located below the second surface, and the side type backlight module further comprises a reflector sheet disposed between the second surface and the part of the fixing frame.

7. The side type backlight module according to claim 1, further comprising a reflector sheet disposed on the second surface.

8. The side type backlight module according to claim 1, further comprising
    a second adhesive layer disposed between the second circuit board and the light guide plate and adhering the second circuit board to the light guide plate.

9. The side type backlight module according to claim 1, further comprising a fixing frame disposed beside the light incident surface, wherein the fixing frame comprises:
    an upper board, wherein the first circuit board is located between the upper board and the first surface;
    a side board, wherein the first light emitting device and the second light emitting device are located between the side board and the light incident surface; and
    a lower board, wherein the side board is connected between the upper board and the lower board, and the second circuit board is located between the lower board and the second surface.

10. A liquid crystal display (LCD), comprising:
    a side type backlight module according to claim 1; and
    an LCD panel disposed on the side type backlight module, wherein the first surface faces the LCD panel.

11. The LCD according to claim 10, wherein the side type backlight module further comprises a mold frame disposed along at least one side of the light guide plate and supporting the LCD panel.

12. An assembly method using a light guide plate and a circuit board, wherein
    the light guide plate comprises
        a first surface defining a light emitting surface,
        a second surface opposite to the first surface, and
        a light incident surface which connects the first surface and the second surface; and
    the first circuit board carries thereon at least one first light emitting device;
    said method comprising:
    adhering the first circuit board to a part of the first surface adjacent to the light incident surface so that the first light emitting device is located beside the light incident surface;
    adhering a second circuit board to a part of the second surface adjacent to the light incident surface, so that at least one second light emitting device disposed on the second circuit board is located beside the light incident surface; and
    placing the light guide plate, as well as the first circuit board and the first light emitting device adhered thereto, into a fixing frame so that the first light emitting device is located between the light incident surface and the fixing frame, and the first circuit board is located between the light guide plate and the fixing frame, thereby obtaining a side type backlight module,
    wherein, during said placing, the second circuit board and the second light emitting device are also placed into the fixing frame, so that the first light emitting device and the second light emitting device are located between the light incident surface and the fixing frame, the first circuit board is located between the first surface and the fixing frame, and the second circuit board is located between the second surface and the fixing frame in the assembled side type backlight module.

13. The assembly method according to claim 12, wherein the first circuit board is adhered to the part of the first surface adjacent to the light incident surface through a first adhesive layer.

14. The assembly method according to claim 12, further comprising
    disposing a reflector sheet on a lower board of the fixing frame before said placing so that, after said placing, the reflector sheet is disposed adjacent the second surface in the assembled side type backlight module.

15. The assembly method according to claim 12, further comprising:

disposing a reflector sheet on a lower board of the fixing frame before said placing so that, after said placing, the reflector sheet is disposed adjacent the second surface in the assembled side type backlight module.

16. The assembly method according to claim 12, further comprising:

disposing an LCD panel on the light guide plate of the assembled side type backlight module, with the first surface facing towards the LCD panel, thereby obtaining an LCD.

17. The assembly method according to claim 16, further comprising disposing a mold frame along at least one side of the light guide plate after said placing, so that the mold frame supports the LCD panel when the LCD panel is placed on the light guide plate.

18. The assembly method according to claim 16, further comprising disposing a front frame on edges of the side type backlight module and edges of the LCD panel.

* * * * *